A. G. BATCHELDER.
Improvement in Fruit and Vegetable Parers.

No. 125,004. Patented March 26, 1872.

Witnesses.

Asahel G. Batchelder
by his attorney.

UNITED STATES PATENT OFFICE.

ASAHEL G. BATCHELDER, OF LOWELL, MASSACHUSETTS.

IMPROVEMENT IN FRUIT AND VEGETABLE PARERS.

Specification forming part of Letters Patent No. 125,004, dated March 26, 1872.

*To all persons to whom these presents may come:*

Be it known that I, ASAHEL G. BATCHELDER, of Lowell, of the county of Middlesex and State of Massachusetts, have invented a new and useful Improvement in Fruit or Vegetable Parers; and do hereby declare the same to be fully described in the following specification and represented in the accompanying drawing, of which—

Figure 1:
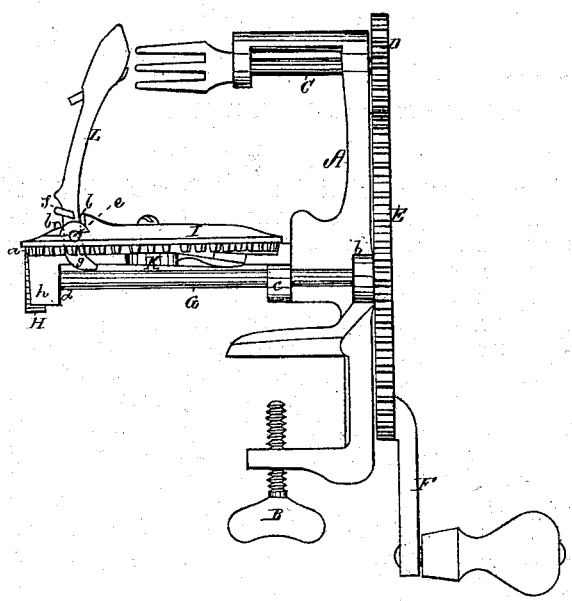
Figure 2:
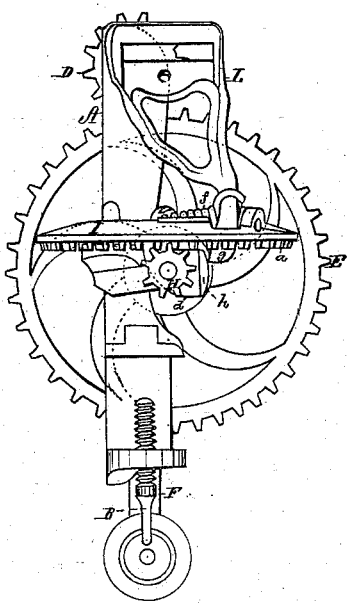
Figure 3:
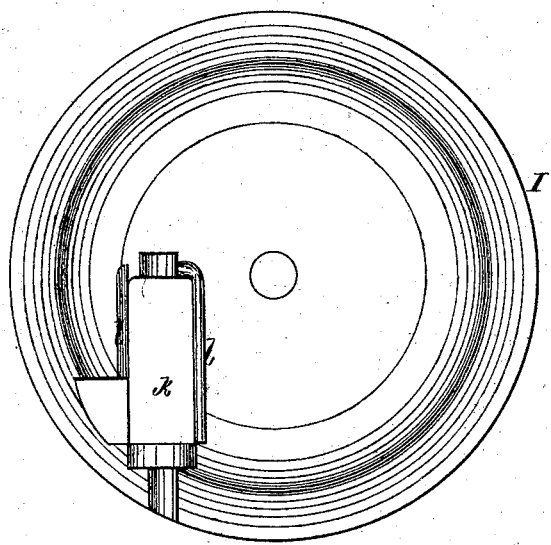
Figure 4:
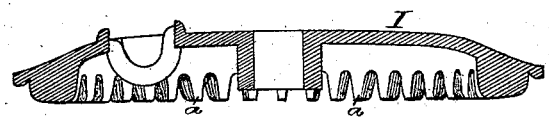

Figure 1 is a side elevation, and Fig. 2 a front end view of a parer provided with my improvement. Fig. 3 is a top view, and Fig. 4 is a transverse section of the larger bevel-gear to be hereinafter described.

In this parer the knife-carrying lever is pivoted to a horizontal bevel-gear, and extends through such a short distance, the lever, as usual, being provided with a spring to press it toward the fruit while engaged in paring the same.

In carrying out my improvement I arrange the said bevel-gear with its teeth downward or beneath the body of the gear, which is so made as to constitute a cover or guard to the said teeth and those of its operative bevel-pinion, the same being in order to prevent them from being clogged by the parings; and furthermore, I extend the driving-shaft across the larger gear and underneath it or its pivot-supporting arm, and arrange the bevel-pinion on the outer end of the said shaft.

By this arrangement I am enabled very much to simplify the machine in comparison to that shown in my patent No. 122,305, dated January 2, 1872; or in other words to employ but two bevel-gears, and dispose their teeth so that the parings discharged by the knife while in operation cannot well fall between them or upon either of them.

In the drawing, A denotes the frame as usually constructed; B, its clamp-screw; C, the furcated shaft; D, the spur-pinion of such shaft; E, the driving-spur gear; F, its crank; and G, the driving-shaft of the bevel-gears H I. K represents the arm for supporting the pivot of the larger or horizontal bevel-gear I, whose body is a solid plate or disk, having its teeth $a$ arranged to project from its lower surface, and to engage with the bevel-pinion H, fixed on the outer end of the shaft G, such shaft being arranged beneath the arm K, and both being extended across the gear I. The shaft G projects from the gear F through suitable bearings $b\ c\ d$ in the frame. The gear I is slotted sufficiently to receive the knife-carrying lever L, its pivot $e$ and pressure-spring $f$, the said lever having its shorter arm $g$ projecting below the said gear, as shown. There is also projected down from the arm K, and in front of the periphery of the bevel-pinion, an auxiliary paring-guard, $h$, the same being as shown in Figs. 1 and 2, its purpose being to prevent any paring while resting on the larger gear, and hanging therefrom, from being drawn in between the two bevel-gears. The spring $f$ is sunk within the slot $k$ of the gear I, and such gear on opposite sides of the slot is provided or made with lips $l\ l$ to rise from it as or nearly as high as the spring. These lips serve as guards to protect the spring from parings or such from being forced into the slot during the process of wiping off the upper surface of the gear.

While the machine is in operation the knife-lever will be carried around by and with the gear I for a portion of its path, and over the upper surface of the arm K; such knife-lever will be maintained in a position to keep the knife out of contact with the fruit and admit of the knife-carrier passing around, underneath, and by the furcated shaft, the upper surface of the arm being properly formed for such, and also to admit of the knife-lever moving up to the fruit as occasion may require.

I herein make no claim to any thing, combination, or arrangement of parts described in the aforesaid patent.

I claim—

1. A paring-machine, composed of a furcated shaft, C, and its operative gears D E, the supporting frame A with its arm K, a knife-carrier lever, L, and its operative spring, the bevel-pinion H and its shaft, and an inverted single paring-guard bevel-gear, I, the body or paring-guard of the said gear I having the teeth and those of the bevel-pinion arranged beneath it so as to be protected, as described, by such body or guard from parings, as set forth.

2. I claim the paring-guard bevel-gear I, arranged with its teeth beneath it, and the shaft G arranged underneath and across such gear or its supporting-arm, and having the bevel-pinion H arranged at the outer end of such shaft, all being substantially as specified.

3. I claim the auxiliary guard $h$, arranged with the bevel-gears H I, and their supporting-arm, substantially in manner and for the purpose as explained.

4. I claim the paring-guard bevel-gear I, as constructed with the slot $k$, and raised lips $l\ l$ arranged in it and with respect to its teeth, substantially as shown.

ASAHEL G. BATCHELDER.

Witnesses:
F. H. NOURCE,
EDWIN A. ALGER.